US006394908B1

(12) United States Patent
Lambert et al.

(10) Patent No.: US 6,394,908 B1
(45) Date of Patent: May 28, 2002

(54) TORSIONAL VIBRATION DAMPERS

(75) Inventors: Adam Johnson Lambert, Warwick; Alastair John Young, Kenilworth, both of (GB)

(73) Assignee: Automotive Products, PLC, Leamington Spa (GB)

( * ) Notice: Subject to any disclaimer, the term of this patent is extended or adjusted under 35 U.S.C. 154(b) by 0 days.

(21) Appl. No.: 09/429,124

(22) Filed: Oct. 27, 1999

(30) Foreign Application Priority Data

Oct. 28, 1998 (GB) ............................................. 9823533
Dec. 23, 1998 (GB) ............................................. 9828399

(51) Int. Cl.$^7$ ................................................. F16D 3/12
(52) U.S. Cl. ........................ 464/65; 192/201; 192/211; 464/2; 464/81
(58) Field of Search ................................. 192/201, 211, 192/210, 210.01, 213.21, 213.22; 464/2, 5, 65, 66, 68, 69, 67, 81, 85, 62

(56) References Cited

U.S. PATENT DOCUMENTS

| | | | | |
|---|---|---|---|---|
| 4,549,642 A | * | 10/1985 | Loizeau | 464/68 |
| 5,092,820 A | * | 3/1992 | Naudin et al. | 464/68 |
| 5,557,984 A | * | 9/1996 | Cooke et al. | 74/574 |
| 5,697,845 A | * | 12/1997 | Curtis | 464/68 |
| 5,848,938 A | * | 12/1998 | Curtis et al. | 464/66 |
| 5,941,134 A | * | 8/1999 | Cooke et al. | 74/574 |

* cited by examiner

Primary Examiner—Lynne H. Browne
Assistant Examiner—Aaron Dunwoody
(74) Attorney, Agent, or Firm—Paul E Milliken; Ray L Weber

(57) ABSTRACT

A torsional vibration damper comprising an input member for connection with a vehicle engine and an output member for connection with a vehicle transmission, the members being mounted for limited relative rotation about a common axis against a damping means comprising one or more circumferentially acting compression springs. Each spring acts between a first abutment formed as an integral part of the input member and a second abutment formed as an integral part of the output member. The damper may also include one or more elastomeric springs or blocks which are subjected to compression in end zones of the relative rotation of the input and output members. Other inventive features of the damper include support members for avoiding fouling of the elastomeric springs or blocks by the compression springs and the use of cantilevered pivot pins for the connection of bob-weight connecting linkages connected between the input and output members. Various friction damping arrangements are also disclosed which can be speed and/or displacement dependent. A method of assembling the damper is also disclosed.

27 Claims, 11 Drawing Sheets

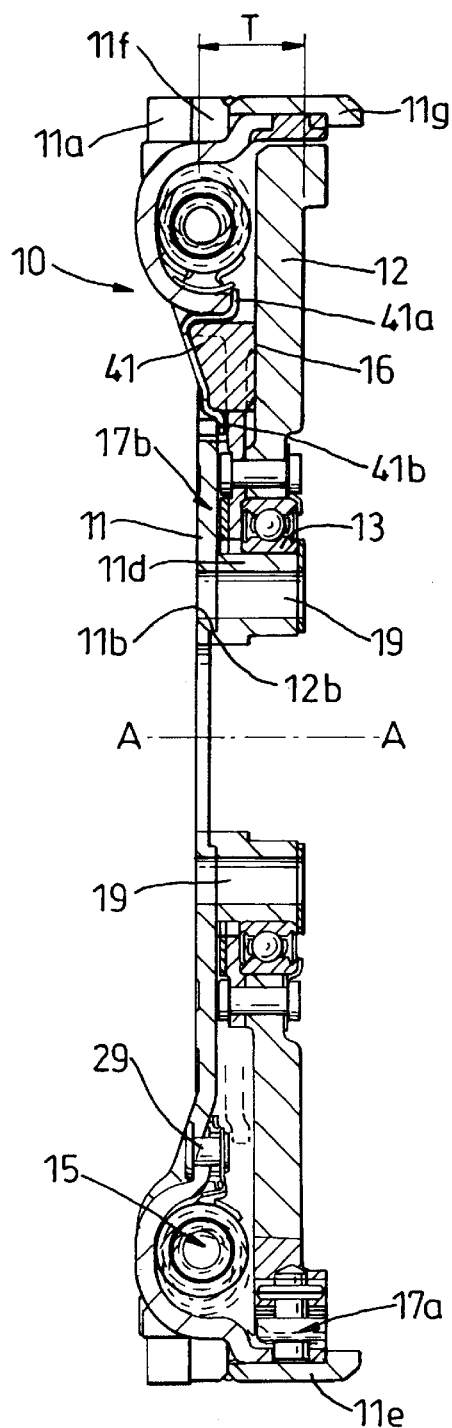
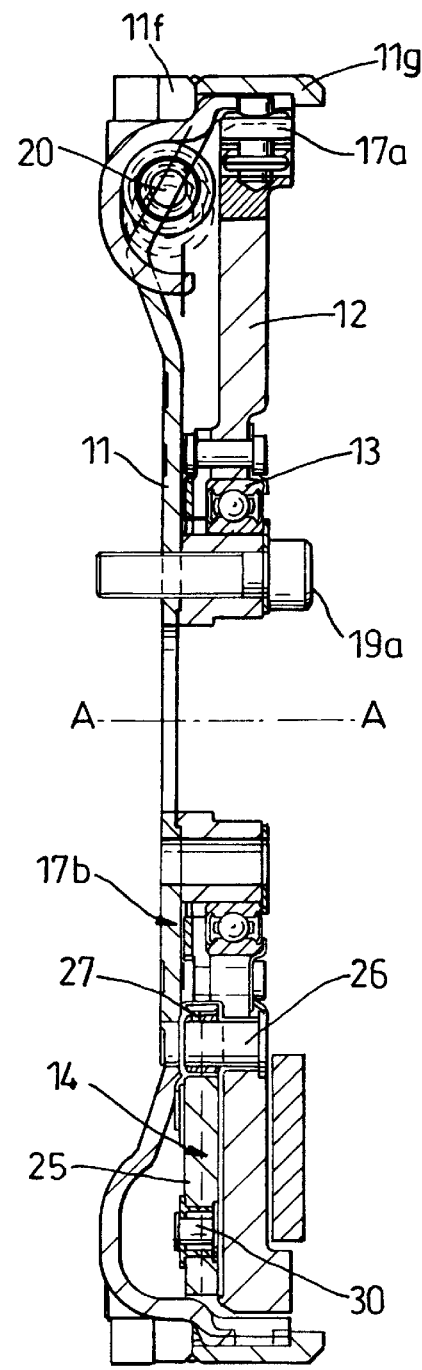
Fig. 2  Fig. 3

TORSIONAL VIBRATION DAMPERS

FIELD OF THE INVENTION

This invention relates to torsional vibration dampers (hereinafter referred to as torsional vibration dampers of the kind specified) which comprise an input member for connection with a vehicle engine and an output member for connection with a vehicle transmission, the members being mounted for limited relative rotation about a common axis against a damping means to damp torsional vibrations in the engine/transmission.

Such torsional vibration dampers are often in the form of a twin mass flywheel in which the input and output members comprise input and output flywheel masses mounted for relative rotation via a support bearing acting between the masses.

Alternatively the input and output members can be of relatively small mass as shown, for example, in the Figures of the Applicant's earlier British patent application No. 98 03046.3.

BACKGROUND OF THE INVENTION

The damping means of such torsional vibration dampers can take a wide range of forms, for example, the damping means may comprise one or more of the following:

- one or more circumferentially acting compression springs;
- one or more circumferentially acting elastomeric compression blocks;
- one or more friction devices;
- one or more hydraulic damping devices, and
- one or more bob-weights connecting linkages (which generate speed dependent damping) connected between the members.

Such torsional vibration dampers therefore tend to be relatively complex devices which consist of a relatively large number of individual parts and are therefore relatively expensive to manufacture.

There is also a requirement to provide an axially compact torsinal vibration damper.

SUMMARY OF THE INVENTION

It is an objective of the present invention to provide a torsional vibration damper of the kind specified with fewer individual parts which is therefore easier and cheaper to manufacture.

It is a further objective of the present invention to provide a torsional vibration damper of the kind specified which is of an axially compact design.

Thus according to one aspect of the present invention in a torsional vibration damper of the kind specified the damping means comprises one or more circumferentially acting compression springs, the or each spring acting between a first abutment formed as an integral part if the input member and a second abutment formed as an integral part of the output member.

Such a construction is particularly advantageous when the torsional vibration damper is a twin mass flywheel with the input mass formed as a single piece sheet metal pressing with integral first spring abutments and the output mass is a cast component with integrally cast second spring abutments.

The construction is also particularly compact in an axial sense which is an important feature of twin mass flywheels for use in congested engine compartments particularly when the engine is disposed transversely relative to the vehicle.

The torsional vibration damper may also include one or more elastomeric springs or blocks which are subjected to compression in end zones of the relative rotation of the input and output members.

In accordance with a further aspect of the present invention such elastomeric springs or blocks are mounted on one of the input or output members between first circumferentially facing abutments formed on or carried by said member and are acted upon by further circumferentially facing abutments formed on or carried by the other member. The elastomeric springs or blocks may also be located radially by a radially outer abutment formed on one of the input or output members. In a preferred and particularly convenient construction both the first circumferentially facing abutments and the radial abutment of each elastomeric spring or block are formed integrally on the input member which may conveniently be formed as a single piece pressing.

Each elastomeric spring or block may be supported by a sheet metal casing member which sits in a window in the input or output member which supports the block or spring.

In accordance with a further aspect of the present invention in a torsional vibration damper of the kind specified which includes circumferentially acting compression springs, the circumferentially acting compression springs are each supported at a radially inner location by a support member (typically of general channel configuration) to avoid fouling adjacent elastomeric springs or blocks which are located radially inwardly of the compression springs. The spring support members deflect the compression springs from their natural straight configuration to an accurate form which bridges the elastomeric springs or blocks.

In a particularly convenient arrangement, in a vibration damper employing bob-weight connecting linkages, the compression spring support member may rest at one end on the radially outer abutment associated with each elastomeric springs or block and may be also fastened at the other end to a pivot pin of an adjacent associated bob-weight connecting linkages.

In accordance with a further aspect of the present invention a torsional vibration damper of the type specified may also be provided with a friction damping device whose frictional damping effect varies with the amount of relative rotation of the input and output members of the damper.

For example, such a rotation dependent damping device may comprise a friction member which is carried by the input or output member and biased into contact with a surface on the other of the input or output members to provide frictional damping. The surface against which the friction member is biased may be in the form of a cam surface orientated with respect to the axis of relative rotation of the input and output members so that the contact pressure of the friction member on the surface increases with relative rotation between the input and output members. The friction member may be arranged to contact the surface only in the last end portion of the relative rotation. In a particularly convenient arrangement the member which is biased into contact with the surface may also act as a stop which co-operates with abutments on the other of the input or output members to limit the relative rotation between the input and output members.

In accordance with a still further aspect of the present invention, in a torsional vibration damper which includes bob-weight connecting linkages, the bob-weights may each be pivotally mounted on one of the input and output members by a cantilevered pivot pin. Each bob-weight may be free to move axially to a limited extent on its cantilevered pin.

The use of cantilevered pivot pins further reduces the axial dimensions of the torsional vibration damper.

Each linkage may be completed by a single flexible link pivoted at one end on the associated bob-weight and at its other end on the other of the input or output members. The single flexible link may conveniently be located on the input member side of the bob-weight.

In a further construction the cantilevered pivot pins and the main support bearing which supports the input and output members for relative rotation are both retained in position by a common retaining member.

The bob-weight may be mounted on the cantilevered pin via a bearing bush which is a press fit in the bob-weight. Similarly the flexible link may be pivoted to the bob-weight via a second bush which is a press fit in the bob-weight and a rivet which carries its own collar and which extends through the second bush.

The flexible link may be pivoted on the other of the input or output members via a stud or other fixing on which the link is sandwiched between a flange formed on a sleeve surrounding the stud or other fixing and a washer.

In accordance with a still further aspect of the present invention a twin mass flywheel of the kind specified includes a friction damping device whose friction damping effect varies with the speed of rotation of the flywheel.

The damping effect may be arranged to decrease (or increase) with the speed of rotation depending on the operating characteristics required from the flywheel. For example, the friction damping device may comprise a friction block supported on one flywheel mass which is biased into rubbing contact with the other flywheel mass and is disposed so that, as the speed or rotation of the flywheel mass increases, the centrifugal effect on the friction block tends to reduce the contact pressure of the block on the other flywheel thus reducing the friction force generated.

The variation in friction forces of the above friction block arrangement can also be made angularly dependent by arranging the block to make contact with circumferentially ramped surfaces on the other flywheel mass.

In accordance with a still further aspect of the present invention in a torsional vibration damper of the kind specified which includes bob-weight linkages and circumferentially acting compression springs interconnecting the input and output members the total permitted relative rotation of the input and output members can be increased by connecting the linkages with the input or output member which supports the compression springs radially inboard of the compression springs thus allowing longer linkages to be employed.

In yet a further alternative construction the damping means may comprise a single plate friction damper in which the single friction plate is biased against the input or output member or a component carried thereby by a belleville spring or other axially acting spring member which acts against the other of the input or output members. This simple instruction again saves axial space.

The present invention also provides a method of assembly of a torsional vibration damper of the kind specified which includes one or more cantilevered pin mounted bob-weight connecting linkages, said method including the steps of:

assembling one or more bob-weight connecting linkages;

pivotally connecting one end of the or each linkage to one of the input or output members;

inserting respective locating pin through a respective locating aperture in said one of the input or output members and into a first cantilevered pivot pin bore at the other end of the or each linkage through which the cantilevered pivot pin is to extend;

completing the assembly of the remainder of the torsional vibration damper onto the input and output members;

placing the other of the input and output members over said one member with second cantilever pin bore(s) in said other member in line with the locating Pin(s), and inserting the cantilevered pin(s) into said first bore(s) thus displacing said locating pin(s) from said first bore(s) and connecting the or each linkage with said other member.

Preferably the cantilevered pin(s) are inserted into the second cantilevered pin bore(s) prior to the placing of the other member over said one member and the locating pin(s) are displaced from the first bore(s) as the other member is lowered onto said one member.

In such an arrangement the method preferably includes the further step of securing to said other member a common retaining member for the main support bearing and the cantilevered pin(s) prior to placing the other member over said one member.

Such an arrangement necessitates the mounting of the main support bearing on the other of said input or output members prior to placing said other member over said one member.

The invention also provides a torsional vibration damper assembled by the above method in which one of the input or output members includes a locating pin aperture in axial alignment with the or each cantilevered pivot pin.

BRIEF DESCRIPTION OF THE DRAWINGS

The present invention will now me described, by way of example only, with reference to the present invention in which:

FIGS. 2 and 3 are sectors outlines X-X and Y-Y respectively of FIG. 1;

DETAILED DESCRIPTION OF THE INVENTION

Figure 1:
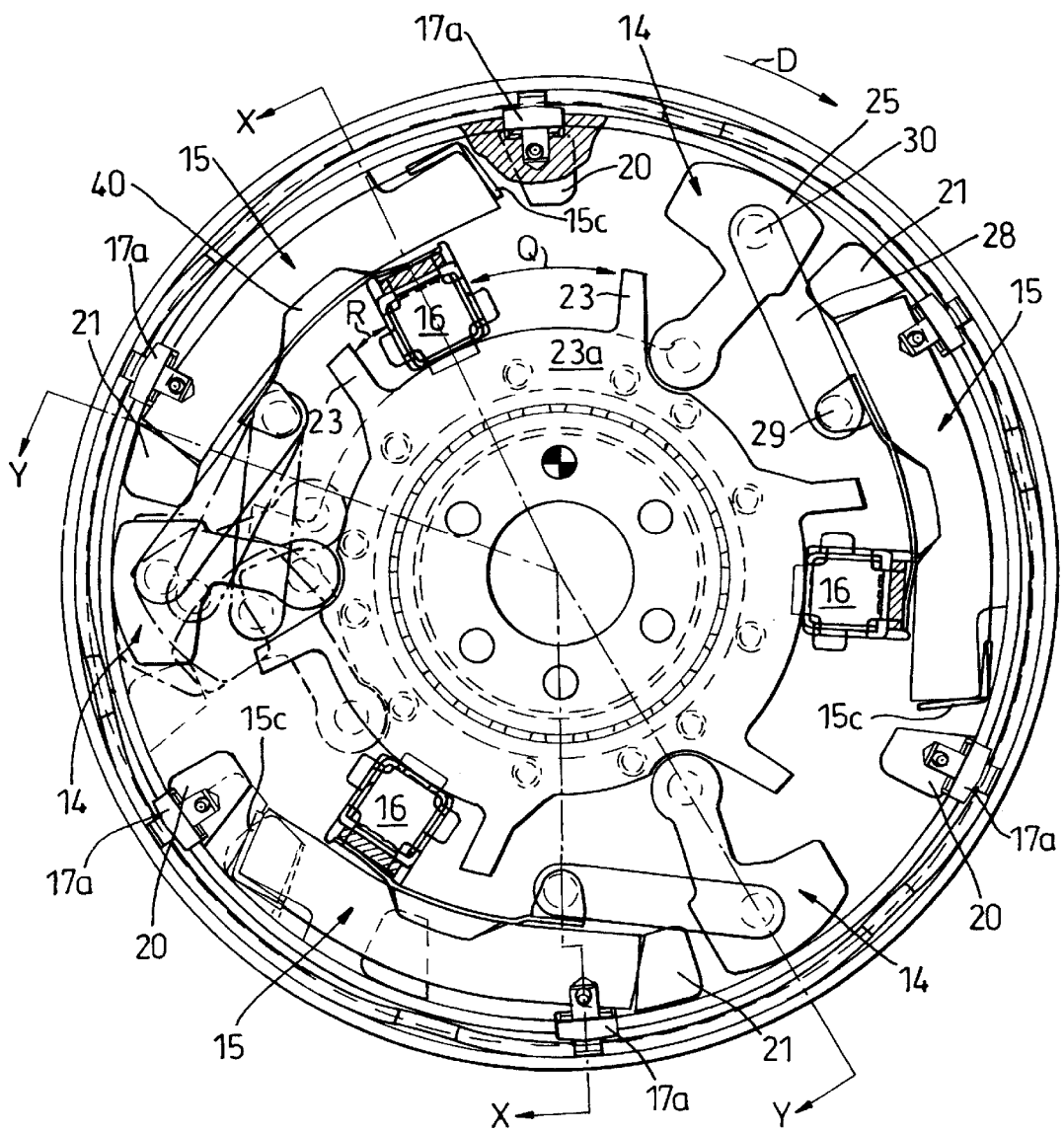
FIG. 1 is s side view of a torsional vibration damper in the form of a twin mass flywheel embodying the various aspects of the present invention.
Figure 4:
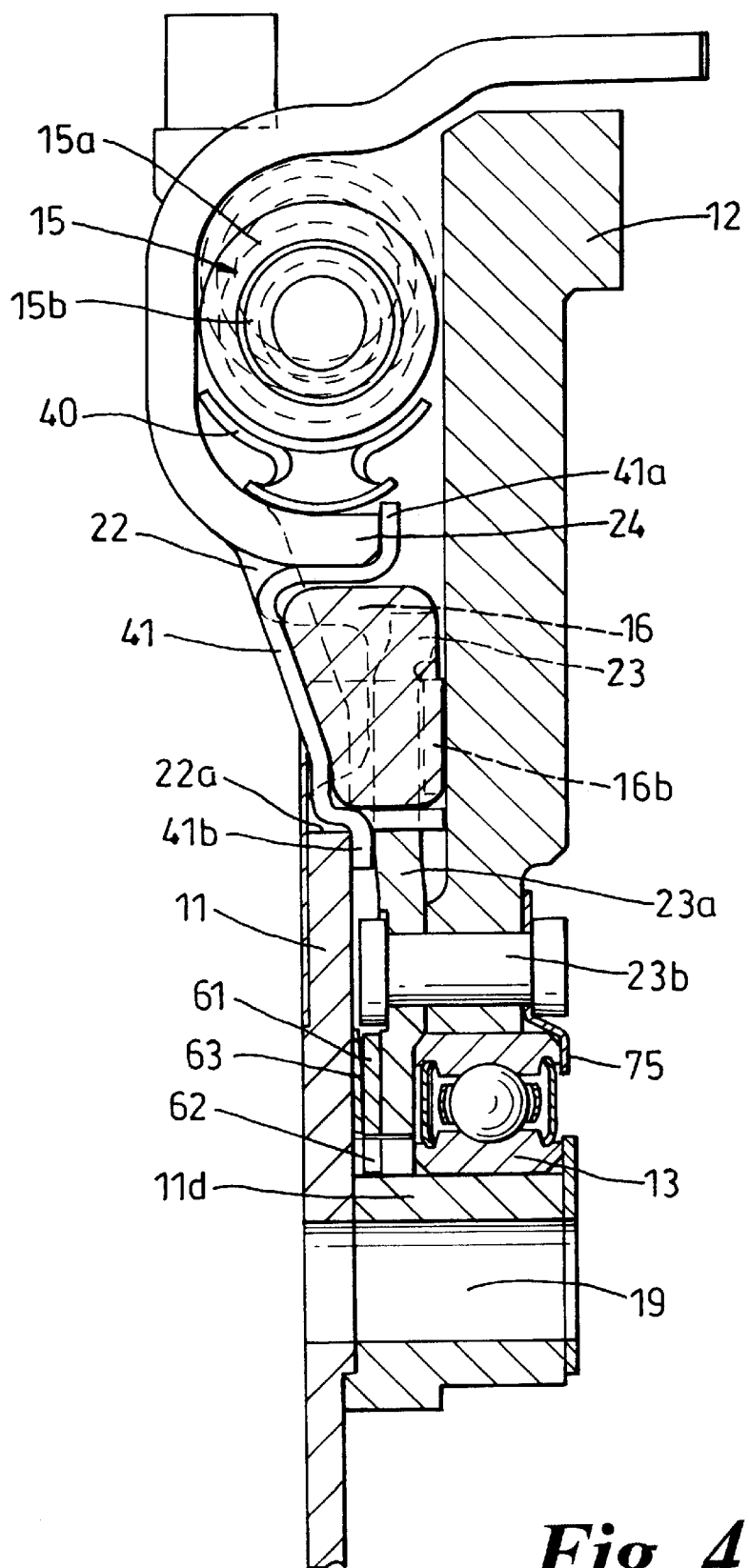
FIG. 4 shows the top half of FIG. 2 on a larger scale.
Figure 5:
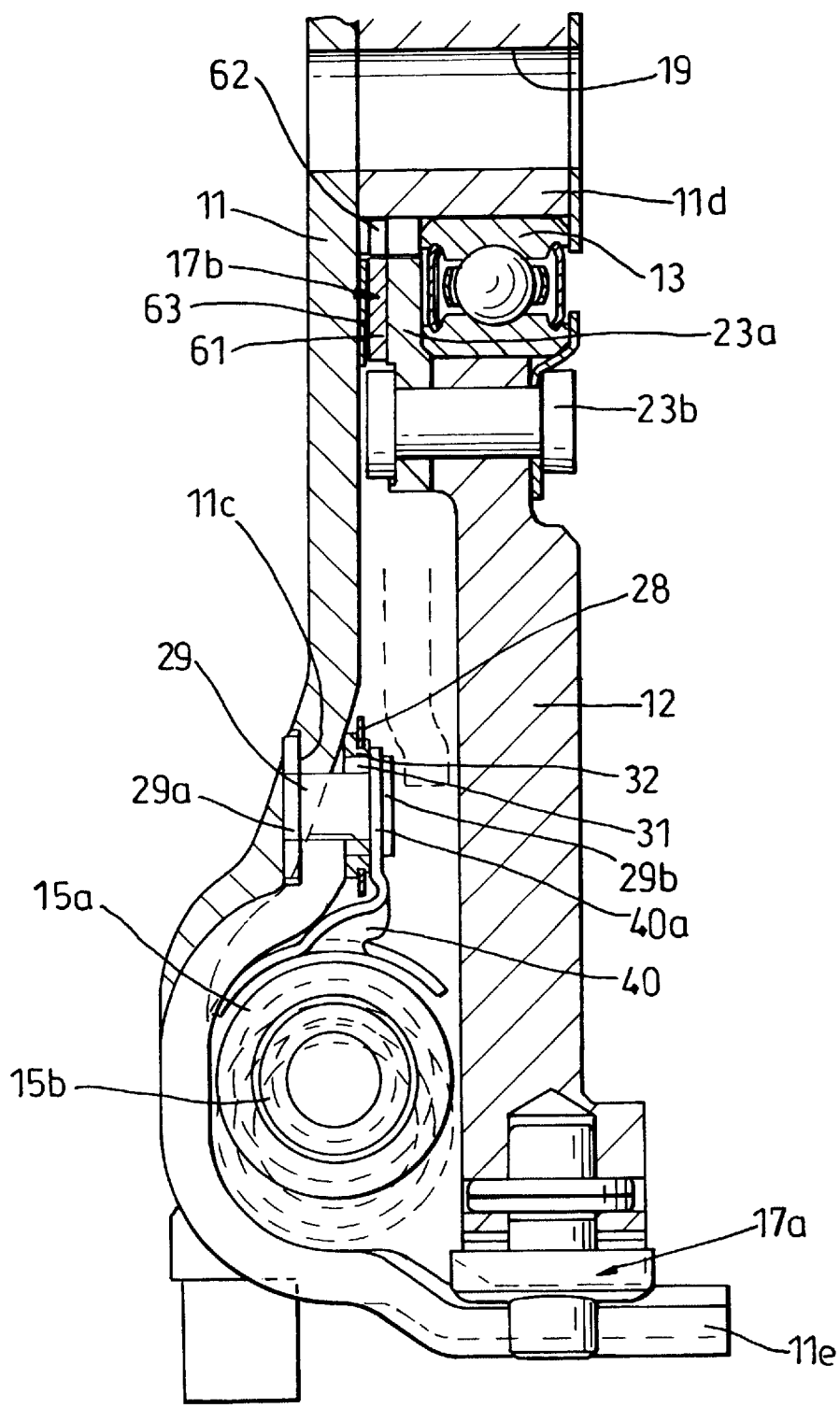
FIG. 5 shows the bottom half of FIG. 2 on a larger scale.
Figure 6:
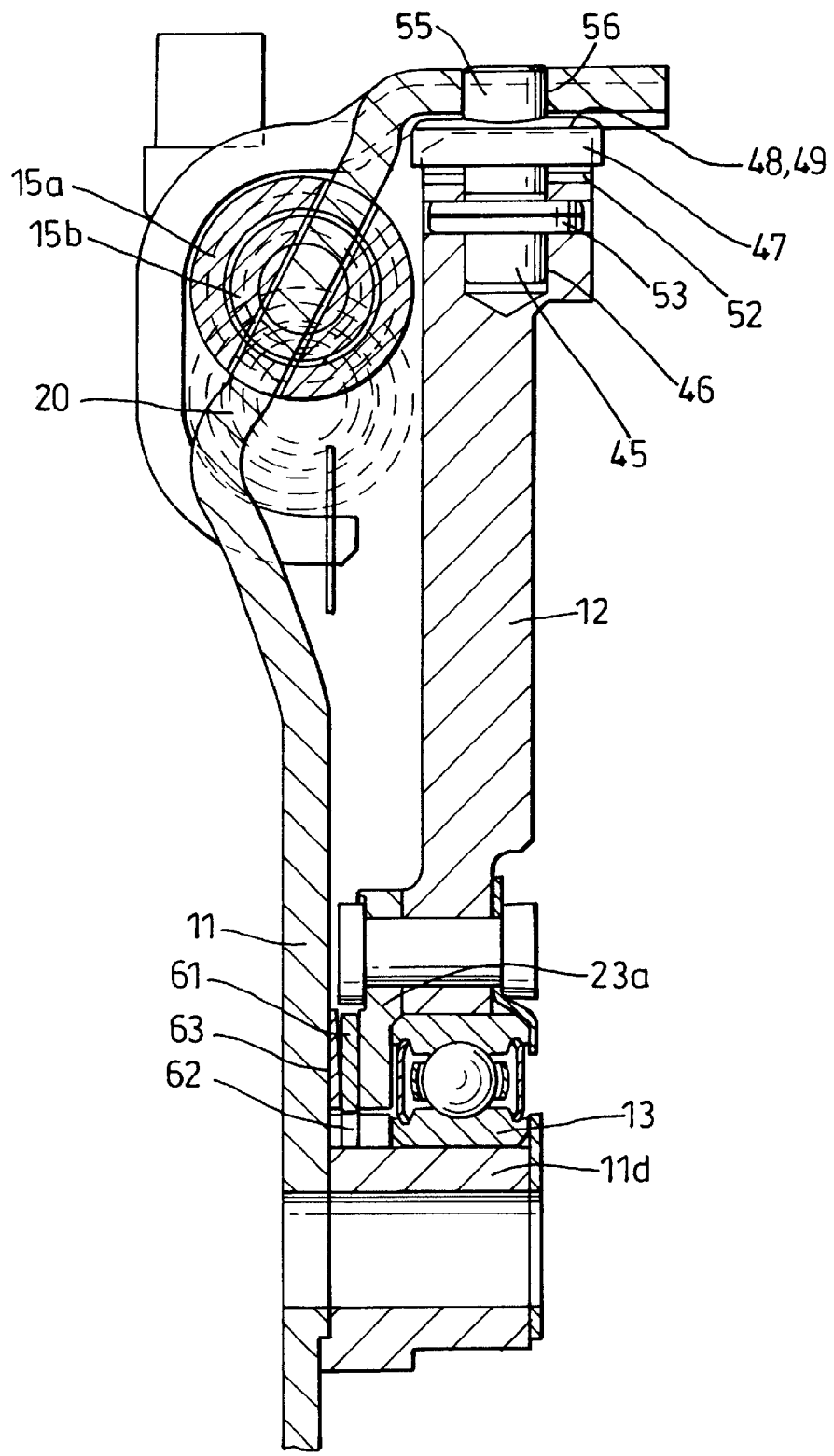
FIG. 6 shows the top half of FIG. 3 on a larger scale.
Figure 7:
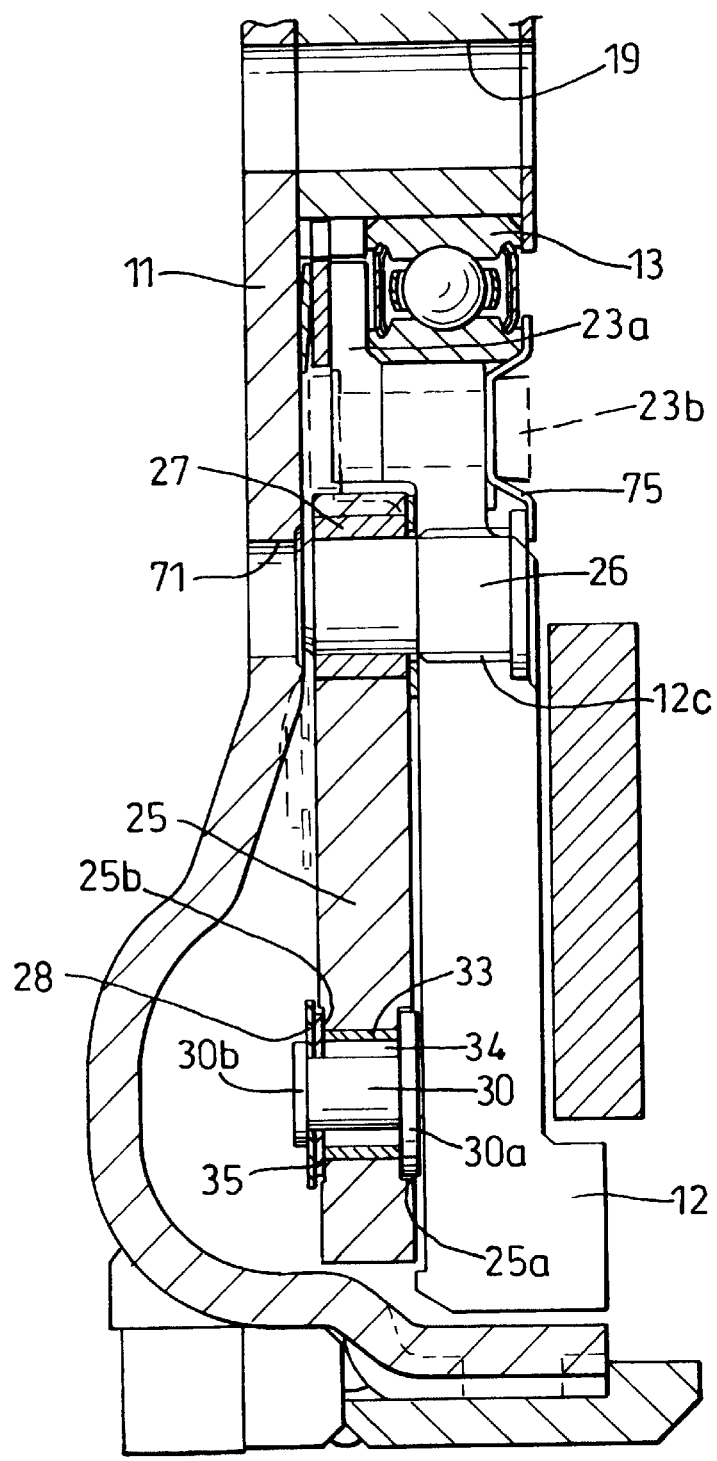
FIG. 7 shows the bottom half of FIG. 3 on a larger scale.
Figure 8:
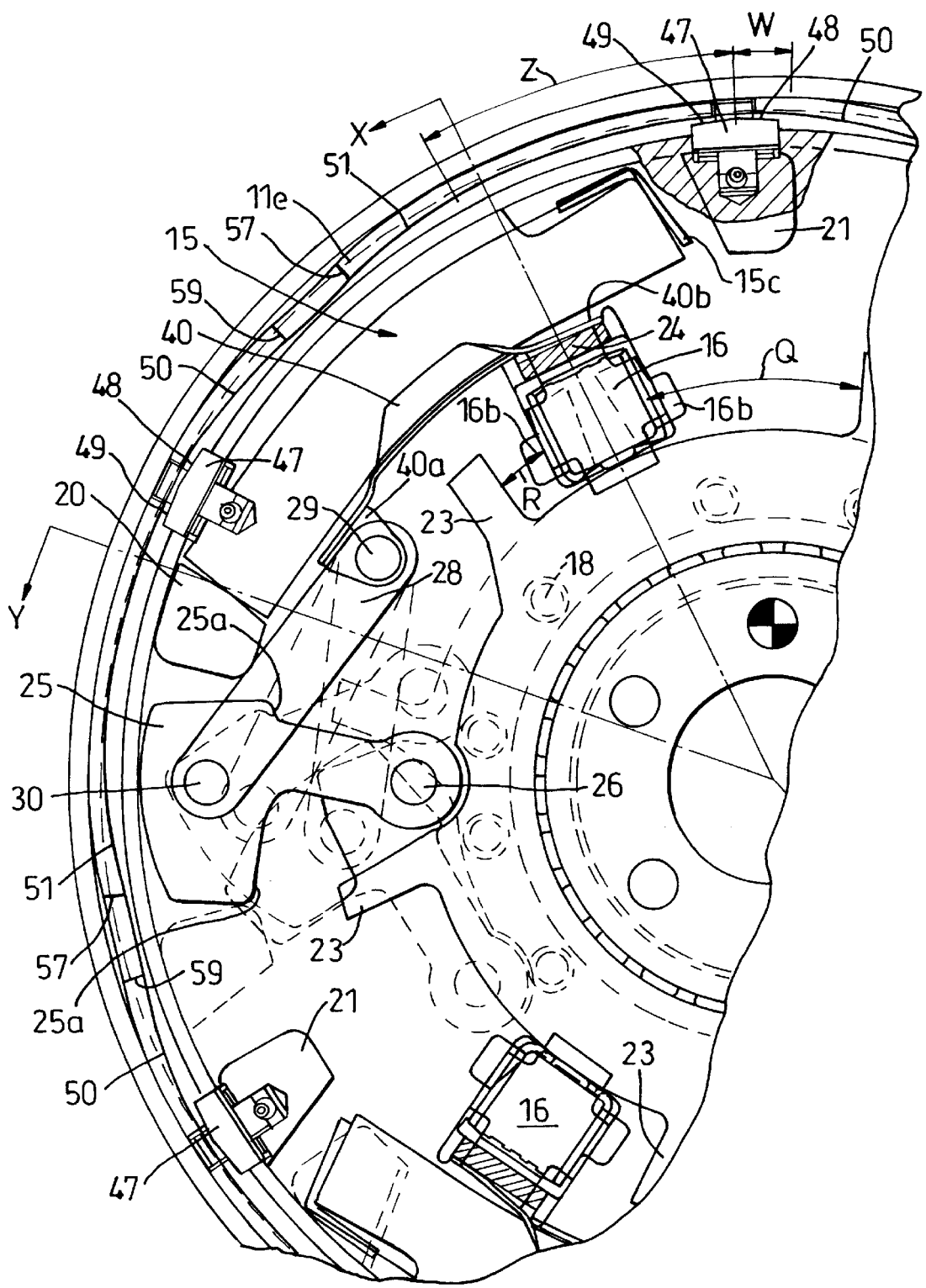
FIG. 8 shows part of FIG. 1 on a larger scale.

Referring to FIGS. 1 to 8, a twin mass flywheel 10 comprises an input flywheel mass 11, carrying a starter ring 11a and additional inertia rings 11f and 11g (see FIGS. 2 and 3) which are welded in position, and an output flywheel mass 12 which are mounted for limited relative rotation about a common axis A-A via a plain bearing 13 carried on a bearing support block 11d. Relative rotation of the input and output flywheel members is opposed by a damping means in the form of bob-weight connecting linkages 14, compression spring assemblies 15, elastomeric springs 16, radially outer friction damping devices 17a and a radially inner single plate friction damper 17b. All these damping means act in parallel between the input and output flywheel masses.

Input flywheel mass 11 is of a pressed metal construction and the output flywheel mass 12 is of a cast metal construction. These two flywheel masses are centred relative to each other during assembly via annular surfaces 11b and 12b respectively and are held in an assembled state, prior to attachment to the associated engine crankshaft by studs 18 (see FIG. 8). As is conventional the twin mass flywheel is bolted to the crankshaft by attachment bolts 19a which extend through circumferentially spaced bolt holes 19 in bearing support block 11d and input flywheel mass 11.

Compression spring assemblies 15 each act between a first abutment 20 (see FIG. 8) which is pressed out of input flywheel 11 and a second abutment 21 which is cast into output flywheel 12. By forming both of the abutments integrally with the respective flywheel masses the number of separate components in the flywheel is significantly reduced and the axial space required is also reduced since separate spring abutment members are eliminated. As can be seen from FIGS. 3 and 6, abutments 20 extend diagonally across the diameter of the associated spring 15 thus ensuring good contact.

Each compression spring assembly may comprise an outer compression spring 15a and an inner compression spring 15b with the operation of the inner compression spring 15b being timed to be delayed by several degrees from the commencement of the operation of the outer compression spring 15a.

Alternatively, one pair of diametrically opposite compression springs 15 may be arranged to operate before the other pair of diametrically opposite compression springs during the relative rotation of the two flywheel masses.

The springs 15a and 15b have a natural shape in which their longitudinal axes are straight. When mounted between abutments 20 and 21 the springs are deflected to an acute shape by a sheet metal support member 40 which will be described further below.

FIG. 1 shows the flywheel in its central or neutral position and, with the flywheel rotating in the direction of arrow D, in the normal drive condition a relative rotation of P occurs before abutments 21 are contacted by spring chairs 15c which fir around the end of the springs. Springs 15 are non-operational in the overrun condition when abutments 21 tend to move away from springs 15.

Figure 9:
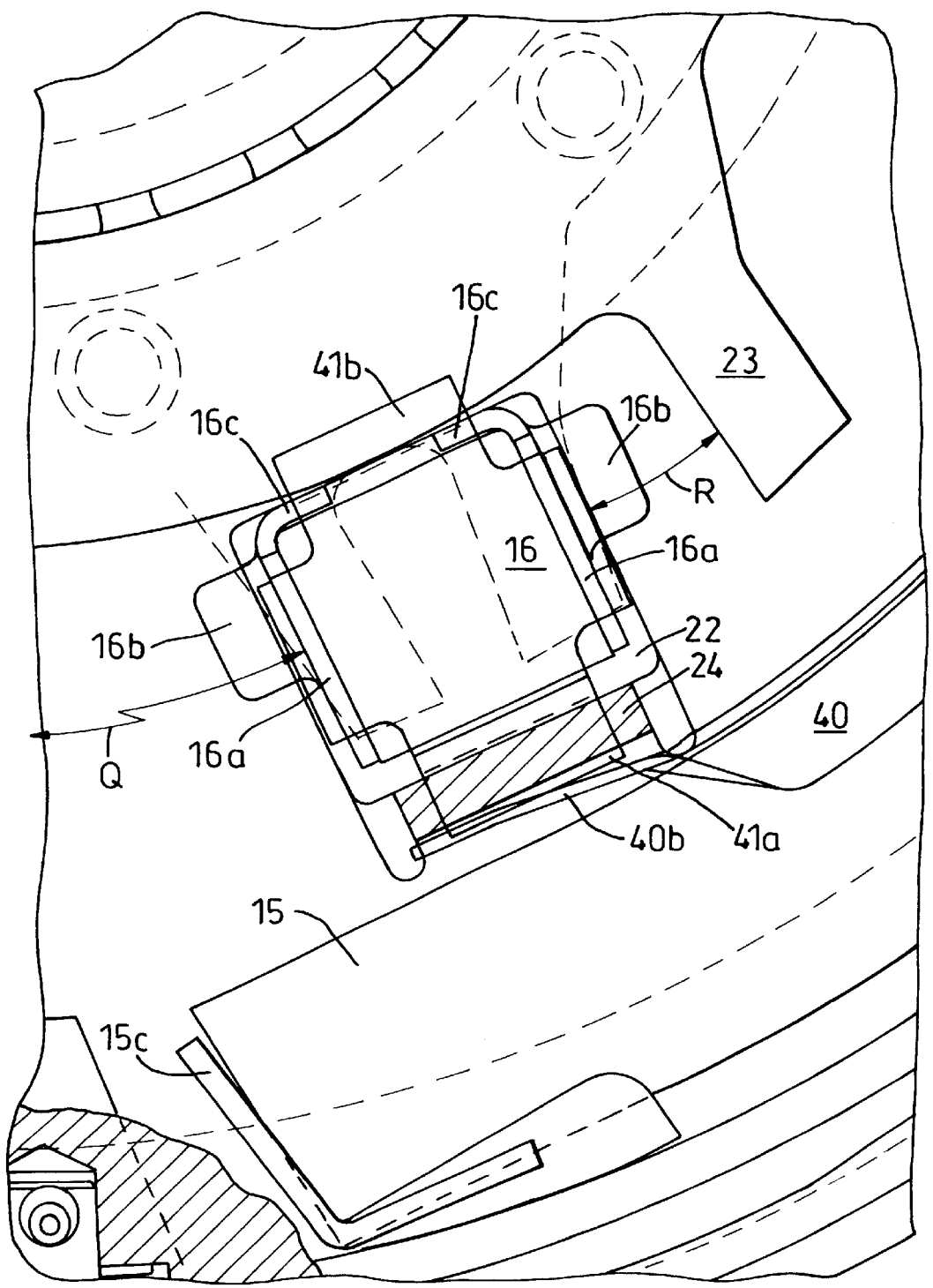
FIG. 9 shows details of an elastomeric spring of block used in the twin mass flywheel of FIG. 1 on a larger scale.
Figure 10:
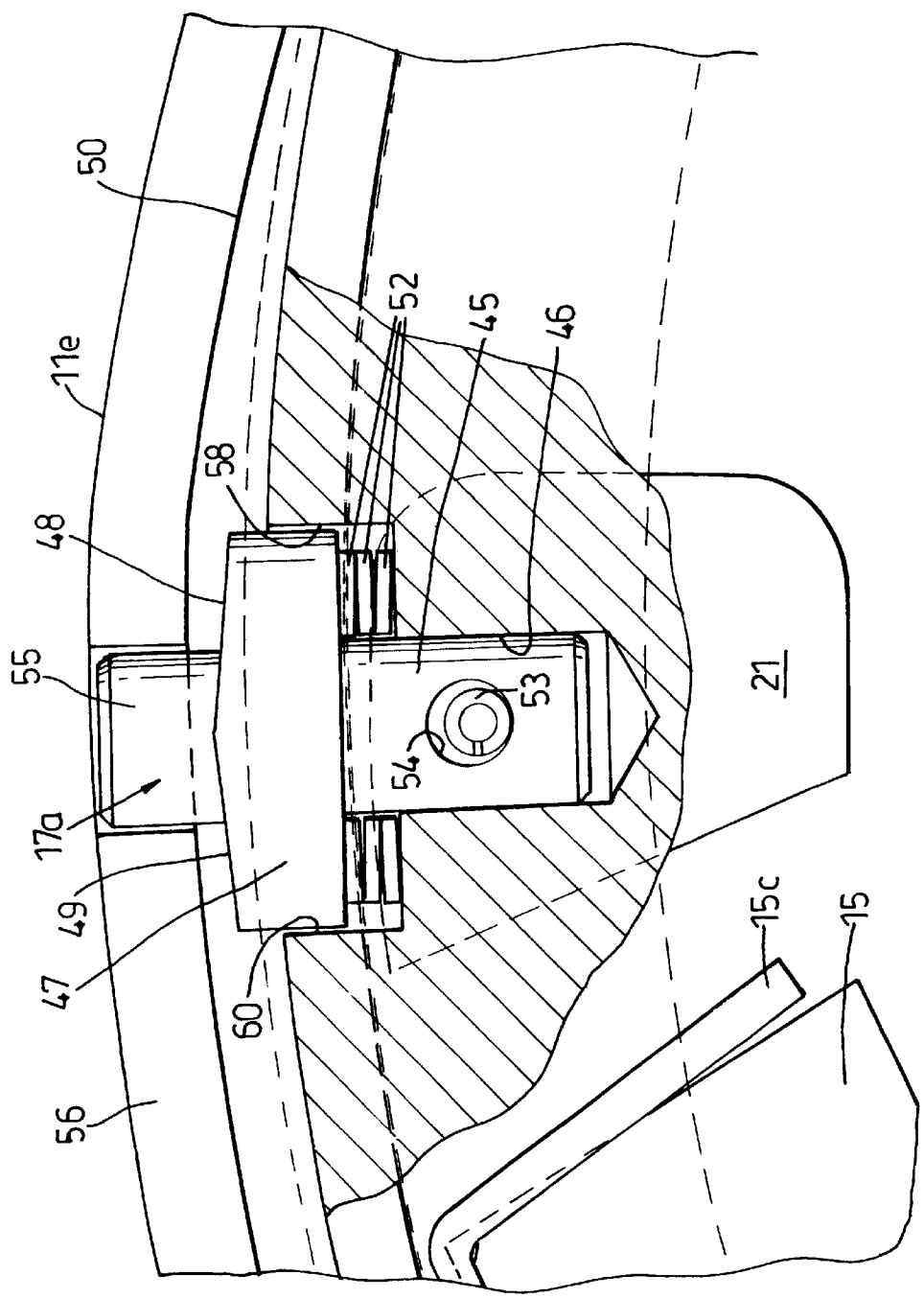
FIG. 10 shows details of a rotation dependant friction damper used in the twin mass flywheel of FIG. 1 on a larger scale.

The elastomeric compression springs or blocks 16 (see FIGS. 8 and 9) are each supported on the input mass 11 between end plates 16a in a window 22 pressed out of input flywheel mass 11 by a sheet metal casing member 41. Member 41 has end portions 41a and 41b which (see FIG. 4) are respectively curved around a radially outer abutment 24 which is pressed out of input flywheel mass 11 and around the bottom edge 22a of window 22.

The end plates 16a are acted upon by abutments 23 on a ring 23a which is secured to output flywheel mass 12 by rivets 23b. The end plates 16a have wings 16b which extend between abutments 23 and output mass 12 and tabs 16c which hook under the radially inner edge of block 16. Each elastomeric spring block 16 is also located against radially outwards movement relative to mass 11 by radially outer abutment 24.

The elastomeric springs 16 are therefore confined within windows 22 between the two flywheel masses 11 and 12. As will be appreciated the blocks 16 operate to damp relative rotation of the flywheel masses in the end zones of the relative rotation both in the drive and overrun conditions. Blocks 16 operate in the drive condition after a relative rotation of Q and in the overrun condition after a relative rotation of R.

Each bob-weigh linkage 14 comprises a bob-weight 25 which is pivotally mounted on output flywheel mass 12 via a cantilevered pivot pin 26 and a bush 27 which is press fit into the bob-weight.

The linkage is completed by a flexible link 28 which is connected at one end with the input flywheel mass 11 via a rivet 29 and at its other end with a bob-weight 25 via a rivet 30.

Each rivet 29 has a head 29a which engages an annular seating 11c on input mass 11. An axial spacer is mounted on rivet 29 between a mounting tab 40a of support member 40 and a riveted head 29b of rivet 29. Surrounding spacer 31 is a metal bush 32 which is riveted into link 28 with relative rotation of link 28 relative to input mass 11 occuring between bush 32 and spacer 31. The other end 40b of spring support member 40 rests on outer radially abutment 24.

The pivotal connection of link 28 with bob-weight 25 via rivet 30 comprises a bush 33 which is pressed into bob-weight and on axial spacer 34 which surrounds rivet 30. Head 30a of rivet 30 is recessed at 25a into bob-weight 25 and a washer 35, also partly recessed into bob-weight 25 at 25b, is clamped between link 28 and bob-weight 25 by riveted head 30b.

As can be seen from FIG. 1, pivots 29 are located radially within compression spring assemblies 15. This allows a longer length for links 28 so that the total permitted relative rotation between the input and output flywheel masses can be increased.

Bob-weights 25 are also shaped having a cut-out portions 25a, to concentrate their mass as radially far outwards as possible.

Each radially outer friction device 17a, there are sic in total, comprises a plunger 45 slideable in a bore 46 in output mass 12. The plunger has a head portion 47 having arcuate friction surfaces 48 and 49 for frictional contact with arcuate ramp surfaces 50 and 51 respectively formed on the inside of the rim portion 11e of input mass 11. As can be seen from FIG. 8, after a relative rotation of Z in the drive condition surfaces 49 and 51 come into contact and plunger 45 is pressed into bore 46 against the action of belleville springs 52 as the relative rotation increases further to increase the contact pressure and hence the frictional damping generated. Thus the friction device 17a provides frictional resistance to the relative rotation of the flywheel masses in the last end portion of this relative rotation in the drive condition. This frictional resistance also increases with increasing relative rotation in the last end portion of rotation.

Similarly after a relative rotation of W in the overrun condition, surfaces 48, 50 come into contact and provide an increasing frictional resistance to further relative rotation in the last end portion of the relative rotation.

The curvatures of the co-operating arcuate surfaces 49, 51 and 48, 50 are arranged to be such that the arcuate surfaces 48, 49 approach their co-operating surfaces 50, 51 so that the surfaces 48, 49 make substantially full face contact with their co-operating cam surface 50, 51 immediately on coming into contact and maintain this full face contact for their entire contact period to ensure maximum frictional contact area in each end portion of relative rotation. The invention is not however limited to such arcuate surface contact.

Plunger 45 is held against radially outward movement relative output mass 12 by a pin 53 which engages in an oversize hole 54 in plunger 45. This prevents contact between surfaces 48 and 50 and surfaces 49 and 51 in the central portion (Z+W) of the relative rotation of the flywheel masses between ram surfaces 50 and 51.

Each plunger 45 also has a pin portion 55 which extends into a slot 56 in input mass portion 11e and in the drive condition eventually contacts end 57 of slots 56 to limit the relative rotation of the flywheel masses. When this contact of pin 55 with slot end 57 occurs force is transmitted from input mass 11 to output mass 12 via pin 55 end plunger head 47 to contact surface 58 of output mass 12.

Similarly in the overrun condition relative rotation is limited by contact between pin 55 and the end 59 of slot 56. In this contact condition the force is again transmitted from pin 55 and plunger head 47 to output flywheel 12 via surface 60 on the output mass.

The single plate friction damper 17b comprises an annular friction ring 61 which is splined at 62 onto bearing support member 11d and which is pressed against ring 23a which rotates with output mass 12 by a belleville spring 62 which reacts against input mass 11, friction ring 61 may be coated with, for example, sprayed on sintered friction material to increase the friction damping generated. This friction damper 17b provides continuous friction damping which damps all relative rotation the flywheel masses.

Figure 11:
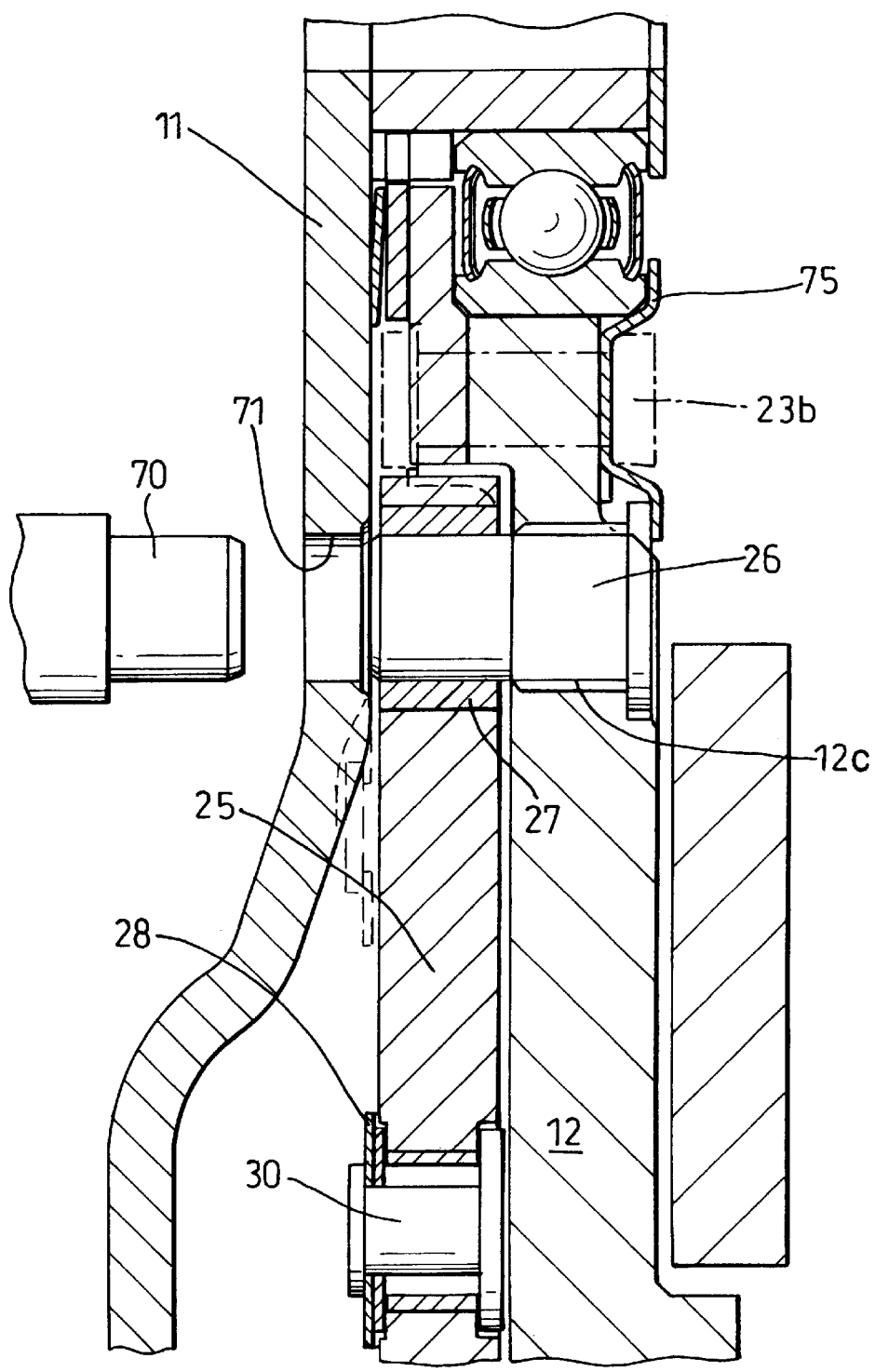
FIG. 11 shows diagramatically a method of assembly of the twin mass flywheel of FIG. 1.

The flywheel shown in FIGS. 1 to 10 may be assembled by the method shown diagrammatically in FIG. 11.

Essentially this method comprises the steps of:

assembling the bob-weight connecting linkages by connecting each link 28 with its bob-weight 25 via pivot 30;

pivotally connecting one end of each linkage to one of the input mass 11 via pivot 29;

inserting a series of locating pins 70 through respective locating apertures 71 in the input mass 11 and into bushes 27;

completing the assembly of the remainder of the torsional vibration damper onto the input and output masses;

placing the output mass over the input mass with the bores 12c in line with the locating pins 70, and inserting the cantilevered pins 26 into the bushes 27 thus displacing said locating pins 70 from the bushes 27 and connecting the linkages with the output mass.

The cantilevered pins 26 are inserted into bores 12c (which are serrated) prior to placing the output mass 12 over the input mass 11 and the locating pins 70 are displaced from the bushes 27 as the output mass 12 is lowered onto the input mass 11 which also carries the bearing support 11d.

The main support bearing 13 is mounted onto the output mass 12 member prior to placing the output mass over the input mass and a common retaining member 75 for the main support bearing and the cantilevered pins 26 is also secured to the output mass 12 by rivets 23b prior to the joining of the two masses.

The axial dimension T of the torsional vibration damper is reduced by the use of direct abutments for springs 15 and 16 on the input and output members (thus avoiding the use of space-taking separate abutment members) and by the use of the cantilevered pins 26 for the mounting of the bob-weights (thus avoiding the need to support the pin on both sides of the bob-weight.)

Figure 12:
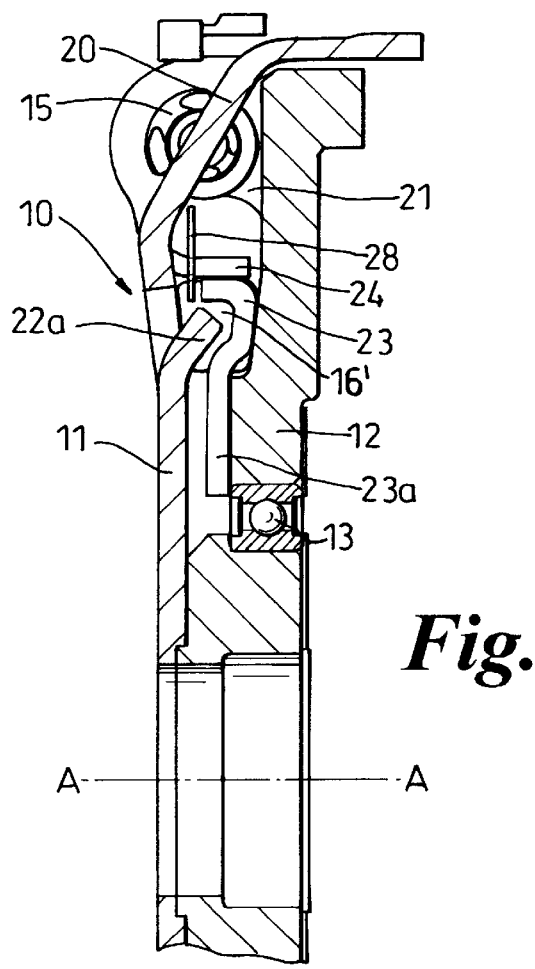
FIG. 12 shows an alternative form of torsional vibration damper embodying the present invention.

It is possible to mount the elastomeric springs 16 on the input flywheel mass 11 without the use of casing members 41 as shown, for example, in FIG. 12 in which abutments 23 carried by output mass 12 and abutments 22a formed on input mass 11 contact plates 16' located on each side of each spring 16.

Figure 13:
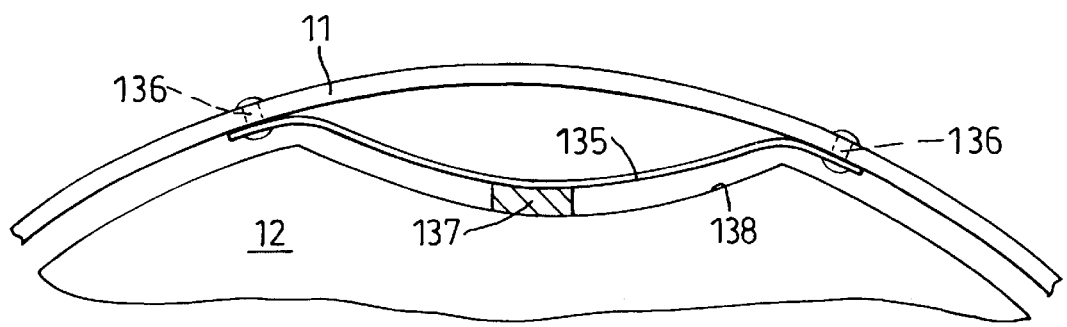
FIG. 13 shows a form of speed dependent friction damping which constitutes another aspect of the present invention.

Also, the torsional vibration damper may be modified to include in place of, for example, outer friction devices 17a speed dependent friction damping devices each of the form shown diagrammatically in FIG. 13. Each such device comprises a spring bow 135 which is rivetted at 136 to the input wheel mass 11 and which carries a friction block 137 which is biased into contact with a portion 138 of the outer periphery of the output flywheel mass 12. Due to the centrifugal effect on the friction block 137, as the speed of rotation of the flywheel increases the contact pressure of block 137 on portion 138 decreases thus reducing the friction generated by the friction damping device. The damper may also be made sensitive to the relative rotation of the flywheel masses by making portion 138 of the outer periphery of mass 12 in the form of a ramp surface so that the friction generated by block 137 increases as the relative rotation of the flywheel masses increases.

What is claimed is:

1. A torsional vibration damper in the form of a twin mass flywheel comprising an input mass for connection with a vehicle engine and an output mass for connection with a vehicle transmission the masses being mounted for limited relative rotation about a common axis against a damping means including bob-weight linkages connected between masses and one or more circumferentially acting compression springs, the damping means being characterized in that the or each spring acts between a first abutment formed as an integral part of the input mass and a second abutment formed as an integral part of the output mass.

2. A damper according to claim 1 in the form of a twin mass flywheel characterized in that the input mass of the flywheel is formed as a single piece sheet metal pressing with integral first spring abutments and the output mass is formed as a cast component with integrally cast second spring abutments.

3. A damper according to claim 2 characterized by the additional inclusion of one or more elastomeric springs or blocks which are subjected to compression in end zones of the relative rotation of the input and output masses.

4. A damper according to claim 3 characterized in that the elastomeric springs or blocks are mounted on one of the input or output members between first circumferentially facing abutments formed on or carried by said member and are acted upon by a second circumferentially facing abutments formed on or carried by the other member, the elastomeric springs or blocks being located radially by a radially outer abutment formed on one of the input or output members.

5. A damper according to claim 4 characterized in that each elastomeric spring or block is supported by a sheet metal casing member which sits in a window in the input or output member which supports the block or spring.

6. A torsional vibration damper comprising an input member for connection with a vehicle engine and an output member for connection with a transmission, the members being mounted for limited relative rotation about a common axis against a damping means including bob-weight connecting linkages and one or more circumferentially acting compression springs, the damper being characterized in that each compression spring is supported at a radially inner location by a support member to avoid fouling adjacent elastomeric springs or blocks which are located radially inwardly of the compression spring, each compression spring support member resting at one end on a radially outer abutment associated with each elastomeric spring or block and is also fastened at the outer end to a pivot pin of an adjacent one of the bob-weight connecting linkages.

7. A damper according to claim 6 characterized in that the spring support members deflect the compression springs from their natural straight configuration to an accurate form which bridges the elastomeric springs or blocks.

8. A torsional vibration damper comprising an input member for connection with a vehicle engine and an output member for connection with a vehicle transmission the members being mounted for limited relative rotation about a common axis against a friction damping device whose frictional damping effect varies with the amount of relative rotation of the input and output members of the damper, the damper being characterized by comprising a friction member which is carried by the input or output member and biased into contact with a surface on the other of the input or output members to provide frictional damping, the surface against which the friction member is biased being in the form of a cam surface orientated with respect to the axis of relative rotation of the input and output members so that the contact pressure of the friction member on the surface increases with relative rotation between the input and output members.

9. A damper according to claim 8 characterised in that the friction member is arranged to contact the surface only in the last end portion of the relative rotation between the input and output members.

10. A damper according to claim 8 characterized in that the friction member which is biased into contact with the surface also acts as a stop which co-operates with abutments on the other of the input or output members to limit the relative rotation between the input and output members.

11. A damper according to claim 8 characterized in that the friction member comprises a plunger slideably in a generally radially orientated bore, the plunger being restrained against radially outward movement under centripetal forces as the damper rotates and having ramp portions for contact with the cam surface.

12. A torsional vibration damper comprising an input member for connection with a vehicle engine and an output member for connection with a vehicle transmission the members being mounted for limited relative rotation about a common axis against a damping means, the damping means including bob-weight connecting linkages characterized in that each bob weight is pivotally mounted on one of the input and output members by a cantilevered pivot pin.

13. A damper according to claim 12 characterized in that each bob-weight is free to move axially to a limited extent on its cantilevered pin.

14. A damper according to claim 12 characterized in that each linkage may be completed by a single flexible link pivoted at one end on the associated bob-weight and at its other end on the other of the input or output members.

15. A damper according to claim 14 characterized in that the single flexible link is located on the input member side of the bob-weight.

16. A damper according to claim 12 characterized in that the cantilevered pivot pins and a main support bearing which supports the input and output members for relative rotation are both retained in position by a common retaining member.

17. A damper according to claim 12 characterized in that the bob-weight may be mounted on the cantilevered pin via a bearing bush which is a press fit in the bobweight.

18. A damper according to claim 17 characterized in that the flexible link is pivoted to the bob-weight via a second bush which is a press fit in the bob-weight and a rivet which carries its own collar and which extends through the second bush.

19. A damper according to claim 12 characterized in that the flexible link is pivoted on the other of the input or output members via a stud or other fixing on which the link is sandwiched between a flange formed on a sleeve surrounding the stud or other fixing and a washer.

20. A torsional vibration damper comprising an input member for connection with a vehicle engine and an output member for connection with a vehicle transmission the members being mounted for limited relative rotation about a common axis against a damping means characterized by the inclusion of a friction damping device whose friction damping effect varies with the speed of rotation of the damper.

21. A damper according to claim 20 characterized in the friction damping device comprises a friction block supported on the input of output member which is biased into rubbing contact with the other of the input or output member and is disposed so that, as the speed or rotation of the damper increases, the centripetal effect on the friction block tends to reduce the contact pressure of the block on the other member thus reducing the friction force generated.

22. A damper according to claim 21 characterized in that the variation in friction forces of the friction block also varies dependent on the angle of relative rotation of the input and output members by arranging the block to make contact with a circumferentially ramped surface on the other member.

23. A damper according to claim 20 characterized in that the damping means also includes one or more bob-weight connecting linkages.

24. A torsional vibration damper comprising an input member for connection with a vehicle engine and an output member for connection with a vehicle transmission the members being mounted for limited relative rotation about a common axis against a damping means comprising bob-weight linkages and circumferentially acting compression springs, the damper being characterized in that the total permitted relative rotation of the input and output members is increased by connecting the linkages with the input or output member which supports the compression springs radially inboard of the compression springs thus allowing longer linkages to be employed.

25. A torsional vibration damper assembled by a method comprising one or more cantilevered pin mounted bob-weight connecting linkages, said method including the steps of:
assembling one or more bob-weight connecting linkages;
pivotally connecting one end of the or each linkage to one of the input or output members;
inserting respective locating pin through a respective locating aperture in said one of the input or output members and into a first cantilevered pivot pin bore at the other end of the or each linkage through which the cantilevered pivot pin is to extend;
completing the assembly of the remainder of the torsional vibration damper onto the input and output members;
placing the other of the input and output members over said one member with second cantilever pin bore(s) in said other member in line with the locating pin(s), and inserting the cantilevered pin(s) into said first bore(s) thus displacing said locating pin(s) from said first bore(s) and connecting the or each linkage with said other member, in which one of the input or output member includes a locating pin aperture in axial alignment with the or each cantilevered pivot pin.

26. A method according to claim 25 in which the cantilevered pin(s) are inserted into the second cantilevered pin bore(s) prior to the placing of the other member over said one member and the locating pin(s) are displaced from the first bore(s) as the other member is lowered onto said one member.

27. A method according to claim 25 which includes the further step of securing to said other member a common retaining member for the main support bearing and the cantilevered pin(s) prior to placing the other member over said one member.

* * * * *